United States Patent [19]

Itoh et al.

[11] 4,455,479

[45] Jun. 19, 1984

[54] ELECTRIC OVEN TOASTER

[75] Inventors: Takehiko Itoh; Moriyoshi Sakamoto, both of Yokohama, Japan

[73] Assignee: Tokyo Shibaura Denki Kabushiki Kaisha, Kawasaki, Japan

[21] Appl. No.: 366,669

[22] Filed: Apr. 8, 1982

Related U.S. Application Data

[63] Continuation of Ser. No. 169,171, Jul. 15, 1980, abandoned, which is a continuation-in-part of Ser. No. 5,679, Jan. 23, 1979, abandoned.

[30] Foreign Application Priority Data

Jan. 31, 1978 [JP] Japan .................................. 53-8939

[51] Int. Cl.$^3$ ............................................. F27D 11/00
[52] U.S. Cl. ........................................ 219/405; 99/447; 126/200; 219/411; 219/521; 219/408; 219/347; 350/1.6
[58] Field of Search ............... 219/219, 10.55 D, 405, 219/411, 408, 521, 214, 347, 543, 392, 395; 126/200; 65/60 D; 99/447; 350/1.60

[56] References Cited

U.S. PATENT DOCUMENTS

| Re. 24,296 | 3/1957 | Stewart | 219/405 X |
|---|---|---|---|
| 2,676,117 | 4/1954 | Colbert et al. | 219/543 |
| 2,864,932 | 12/1958 | Forrer | 219/405 X |
| 3,693,538 | 9/1972 | Snyder | 99/447 |
| 4,035,608 | 7/1977 | Stromquist | 219/218 |
| 4,048,978 | 9/1977 | Plumat | 126/200 |
| 4,096,369 | 6/1978 | Tanaka et al. | 219/10.55 D |
| 4,100,330 | 7/1978 | Dowley | 65/60 D |
| 4,343,985 | 8/1982 | Wilson et al. | 219/214 |

FOREIGN PATENT DOCUMENTS

| 2417927 | 10/1974 | Fed. Rep. of Germany | 126/200 |
|---|---|---|---|
| 795912 | 6/1958 | United Kingdom . | |
| 1339469 | 12/1973 | United Kingdom . | |
| 1341616 | 12/1973 | United Kingdom . | |
| 1392458 | 4/1975 | United Kingdom . | |
| 1417333 | 12/1975 | United Kingdom . | |
| 2013874 | 8/1979 | United Kingdom . | |

OTHER PUBLICATIONS

Toshiba Brochure, #55K160 and 54K518.

Primary Examiner—Volodymyr Y. Mayewsky
Attorney, Agent, or Firm—Oblon, Fisher, Spivak, McClelland & Maier

[57] ABSTRACT

A cooking appliance comprising a heating chamber with a window provided on one side. At least one surface of the window is coated with a film of a reflecting metal oxide, such as indium oxide, to such a thickness that food in the heating chamber can be seen through the window.

5 Claims, 8 Drawing Figures

F I G. 4
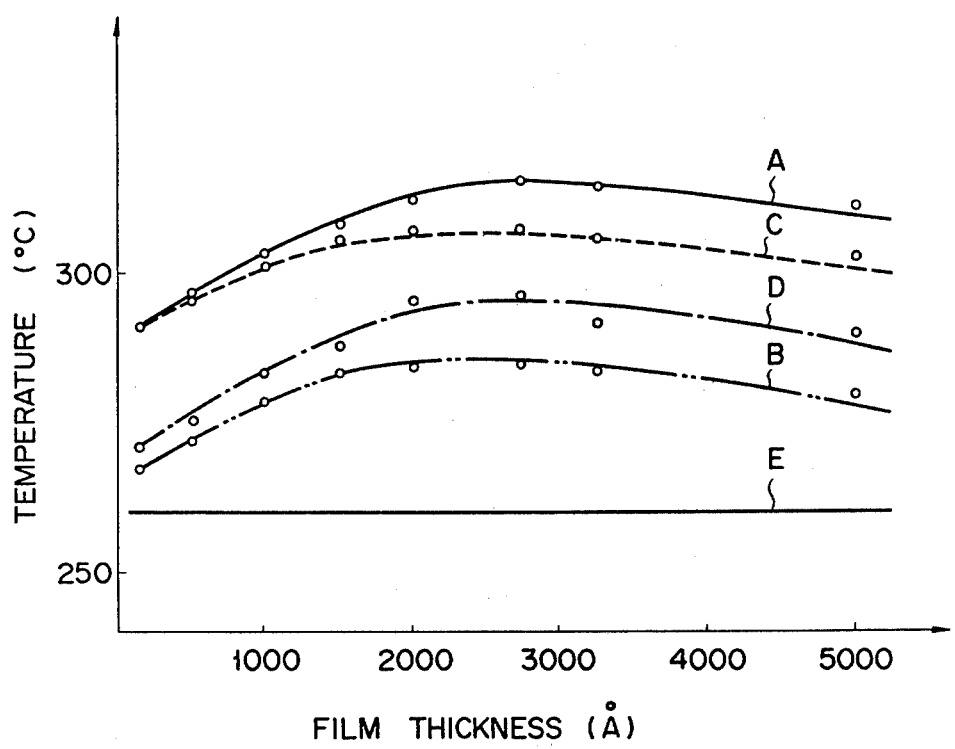

ELECTRIC OVEN TOASTER

CROSS REFERENCE TO RELATED APPLICATIONS

This application is a continuation of U.S. Ser. No. 169,171 filed July 15, 1980, now abandoned, which was a continuation-in-part of U.S. Ser. No. 5,679 filed Jan. 23, 1979, now abandoned.

This invention relates to a cooking appliance and more particularly an electric oven toaster having a window through which it is observed how food in the appliance is cooked.

Known cooking appliances such as oven-toasters have a window with a transparent glass pane so that it can be seen how bread, for example, is toasted in the appliance. The glass pane prevents heat from escaping from the appliance. The glass pane occupies a greater part of the front of the cooking appliance. Some of the radiation energy generated inside the appliance dissipates inevitably through the window. This means a loss of heat. Due to the dissipation of heat a temperature gradient takes place inside the appliance. That is, the temperature is low near the window and high near the rear of the appliance. Consequently the food cannot be heated uniformly, some portion overcooked and other portion undercooked.

An object of this invention is to provide an electric oven toaster which reduces loss of radiation energy through a window thereby to use heat effectively and which can cook food as uniformly as possible.

An electric oven toaster according to this invention has a window with a transparent pane which is coated at least on one surface with a metal oxide material to such a thickness that food in the appliance can be seen, said metal oxide material reflecting thermal radiation generated in the appliance.

Indium oxide or the like is used as the metal oxide material. If the indium oxide is used, it is preferred that indium oxide be coated 200Å or more thick on the transparent pane. If the metal oxide material is coated too thick, it would make it impossible to clearly observe food in the appliance. Thus, indium oxide is coated 5000Å thick at most, preferably 1500 to 3000Å thick. On the film of the metal oxide material thereby may be coated a light-permeating protective film of, for example, silica ($SiO_2$).

This invention can be more fully understood from the following detailed description when taken in conjunction with the accompanying drawings, in which:

FIG. 4 is a graph showing the heat-preserving characteristic of an electric oven toaster according to this invention and that of a conventional cooking appliance;

FIG. 7(I) is a photograph of a slice of bread toasted by a conventional oven-toaster.

Figure 1:
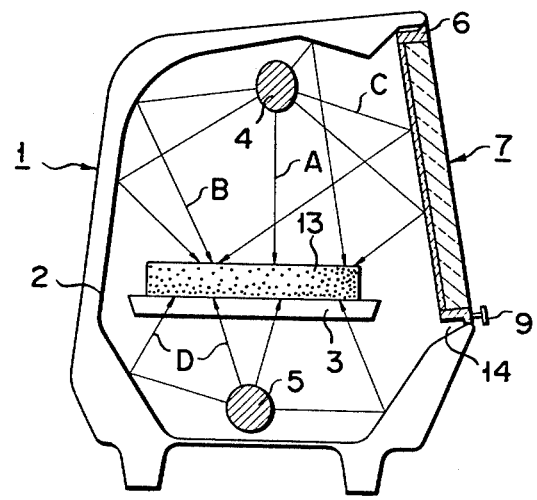
FIG. 1 is a cross sectional view of an electric oven toaster according to this invention.

Now referring to FIGS. 1 and 2, an oven-toaster, an embodiment of this invention will be described. The oven-toaster comprises a housing 1 having a window 14 on one side. All the inner surface of the housing 1 is covered with a reflecting plate 2 which is plated with nickel, chromium or the like. The plate 2 is so bent and curved that infrared rays are reflected and distributed uniformly to a food table 3 which is housed in the housing 1. An elongated electric heater 4 is provided above the food table 3, and another elongated electric heater 5 below the food table 3. The heaters 4 and 5 extend generally across the length of the oven-toaster. Each heater has a longitudinal axis which is positioned in a parallel relationship with respect to the window 14 and to the food table 3. These heaters 4 and 5 are so positioned as to apply infrared rays uniformly to the food table 3, directly or indirectly. The window 14 is constituted by a frame 6 and a transparent pane 7 made of, for example, heat-resistant glass. The transparent pane 7 is hinged to the frame 6 so that it can be opened and closed. Attached to the pane 7 is a handle 9.

Figure 2:
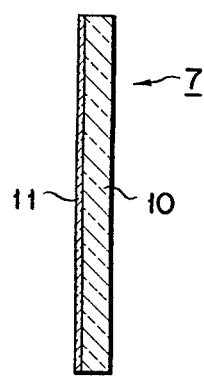
FIG. 2 is a cross sectional view of the transparent window pane of the appliance shown in FIG. 1.
Figure 3:
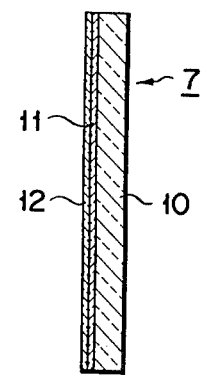
FIG. 3 is a cross sectional view of a modification of the transparent window pane shown in FIG. 2.

As illustrated in FIG. 2, the transparent pane 7 is constituted by a semi-tempered glass plate 10 and a film 11 of a metal oxide material such as indium oxide. The film 11 is laid on one surface of the glass plate 10 and formed by vacuum vapor deposition to such a thickness that food on the food table 3 can be seen through the pane 7. Futher, as shown in FIG. 3, a transparent protective film 12 made of silica or the like may be laid on the film 11 thereby to prevent a wear of the film 11 and thus prolong the life thereof. The protective film 12 serves to increase the mechanical strength of the transparent pane 7. The protective film 12 can be easily formed by known methods such as sputtering, spraying and chemical vapor deposition. By such method the film 12 can have a uniform thickness, and any portion of it transmits the same amount of light.

On the food table 3 of the oven-toaster of the above-mentioned construction a slice of bread 13 is placed. Both electric heaters 4 and 5 are then turned on to emit infrared rays. Some infrared rays from the upper heater 4 impinge directly on the bread 13 to heat the upper surface portion of the bread 13, as arrow A in FIG. 1 indicates. The remaining infrared rays from the heater 4 are reflected on the reflecting plate 2 as depicted by arrow B or on the metal oxide film 11 as indicated by arrow C and then heat the upper surface portion of the bread 13. Most infrared rays from the lower heater 5 heat the lower surface portion of the bread 13, either directly or after being reflected on the reflecting plate 2, as illustrated by arrows D in FIG. 1. Thus, some of the infrared rays emitted from the heaters 4 and 5 to the transparent pane 7 are reflected on the metal oxide film 11 so as to heat the slice of bread 13. As a result, the temperature rises quickly even near the transparent pane 7, whereby the bread 13 can be uniformly heated.

To demonstrate that the temperature inside the oven-toaster according to this invention is elevated quickly and that the reflected infrared rays effectively work to heat the food, the following experiment was conducted. A slice of bread was toasted by the oven-toaster of this invention. Then the transparent pane 7 became clouded up with moisture emitted from the bread about 15 seconds from the start of toasting. Next, a slice of bread was toasted by a known oven-toaster the window glass plate of which is not coated with a metal oxide film. It was found that it took about 45 seconds until the glass plate was clouded up with moisture from the bread.

Obviously in the oven-toaster according to this invention the infrared rays were reflected upon the metal oxide film 11 and quickly raised the temperature inside the oven-toaster.

Now referring to FIG. 4, the heat-preserving characteristic of the oven-toaster according to this invention will be explained. FIG. 4 is a graph wherein the abscissa shows the thickness of a metal oxide film formed on the glass plate 10 and the ordinate shows the equilibrium temperature inside the housing 1. Curves A, B, C and D show the heat-preserving characteristics of oven-toasters according to this invention, and a straight line E shows the equilibrium temperature, about 260° C., inside a conventional 800 W oven-toaster manufactured by Tokyo Shibaura Denki Kabushiki Kaisha.

Curve A shows how the equilibrium temperature inside an 800 W oven-toaster of this invention changed when the thickness of an indium oxide ($In_2O_3$) film on the inner surface of a window glass plate was formed 200Å, 500Å, 1000Å, 1500Å, 2000Å, 2700Å, 3200Å and 5000Å. As curve A teaches, the equilibrium temperature reached a peak of 315° C. when the indium oxide film was 2700Å thick. This peak temperature is 55° C. higher than the equilibrium temperature inside the conventional 800 W oven-toaster.

Curve B illustrates how the equilibrium temperature inside a 620 W oven-toaster of this invention changed when the thickness of an indium oxide ($In_2O_3$) film on the inner surface of a window glass plate was changed as mentioned above. The maximum equilibrium temperature was recorded as high as 274° C. Apparently, the 620 W oven-toaster can preserve heat more effectively than the conventional 800 W oven-toaster with a transparent windowpane which is not coated with a metal oxide film. It is also clear that the 620 W oven-toaster can save much power, 200 W or more, in comparison with the conventional 800 W oven-toaster.

Curve C shows the equilibrium temperature inside an 800 W oven-toaster of this invention changed when the thickness of an indium oxide ($In_2O_3$) film on the inner surface of a window glass plate was changed as mentioned above and a transparent protective film of silica ($SiO_2$) was formed 1500Å thick on the indium oxide film. In this case, as curve C shows, the equilibrium temperature was 40° C. or more higher than that inside the conventional 800W oven-toaster when the indium oxide film was 1000Å or more thick.

Curve D shows how the equilibrium temperature inside an 800 W oven-toaster of this invention changed when a film of indium oxide ($In_2O_3$) was formed on the outer surface of a window glass plate to the above-mentioned various thicknesses. In this case the equilibrium temperature was found to be a little lower than as illustrated by curve C. However, it is 25° C. or more higher than the equilibrium temperature inside the conventional 800 W oven-toaster.

Figure 5:
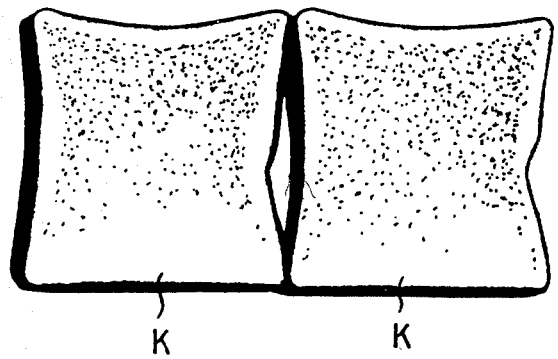
FIG. 5 is a photograph of slices of bread toasted by a conventional oven-toaster.
Figure 6:
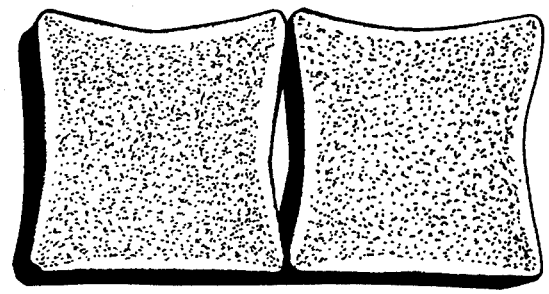
FIG. 6 is a photograph of slices of bread toasted by an oven-toaster according to this invention.
Figure 7:
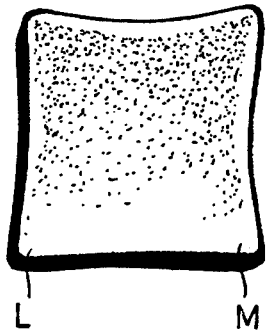
FIG. 7(II) is a photograph of a slice of bread toasted by an oven-toaster according to this invention.
Figure 7:
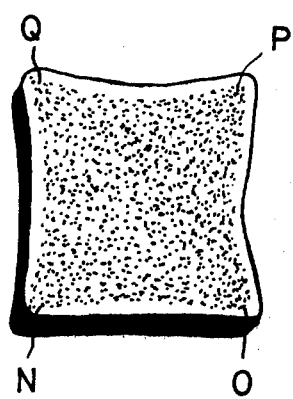

With reference to FIGS. 5 to 7 it will now be explained how many slices of bread were toasted by the above-described 620 W oven-toaster according to this invention and by a conventional 620 W oven-toaster manufactured by Tokyo Shibaura Denki Kabushiki Kaisha, whose transparent windowpane is not coated with a metal oxide film FIG. 5 is a photograph of two slices of bread toasted by the conventional 620 W oven-toaster, and FIG. 6 a photograph of two slices of bread toasted by the 620 W oven-toaster according to this invention. Both oven-toasters were turned on with no bread inside them, and the temperature inside them was raised until it reached a temperature high enough to toast slices of bread. This sufficiently high temperature was maintained in both oven-toasters. Then, slices of bread were put into both oven-toasters at the same time, two slices in each oven-toaster. As FIG. 5 illustrates, the slices of bread taken from the conventional 620 W oven-toaster were toasted substantially not at all at the portion K (lower end portion in FIG. 5) which had been placed near the transparent window-pane. In contrast, as shown in FIG. 6, the slices taken from the 620 W oven-toaster of this invention were toasted brown and uniformly all over its surface. The slices taken out of the conventional oven-toaster were then further toasted by the oven-toaster. It took the conventional oven-toaster more than 75 seconds to toast the slices to the same brownness as the slices toasted by the oven-toaster according to this invention.

FIG. 7(II) is a photograph of a slice of bread toasted by the 620 W oven-toaster of this invention, spending time 75 seconds less than the time which the conventional oven-toaster had spent to toast the slice to such brownness as shown in FIG. 7(I). As FIGS. 7(I) and 7(II) clearly show, corner portions L and M of the slice taken out of the conventional oven-toaster were toasted but insufficiently, while all the corner portions N, O, P and Q of the slice taken from the oven-toaster of this invention, as well as the central portion, were toasted sufficiently to substantially the same extent.

Apparently the oven-toaster according to this invention is advantageous over the conventional one in that it can toast bread quickly and uniformly. That is, the oven-toaster can save much power and can toast much bread in a given time.

As clearly understood from the above described embodiments, according to this invention a metal oxide film may be formed on the inner or outer surface of the transparent glass plate.

In the embodiment shown in FIG. 1 the transparent pane 7 is hinged to the frame 6 and opened and closed so that food can be placed within the oven-toaster. In other words, the pane 7 works not only as a window through which food inside the oven-toaster is observed but also as a door through which food is inserted into the oven-toaster and taken out therefrom. Instead, a door may be provided independently of the transparent pane 7. If this is the case, the door need not, of course, be made of a transparent material.

As mentioned above, the electric oven-toaster according to this invention reduces heat loss and cooks food uniformly, and thus effectively saves power. From an industrial point of view it is therefore highly advantageous. Further, since the temperature inside the electric oven-toaster rises fast thereby to cook food quickly, little moisture escapes from the food so that the food is cooked soft and full. In addition, the electric oven-toaster is advantageous in that its transparent pane is not heated so hot as those of conventional toasters. Still further, since these advantages can be accomplished merely by substituting a glass plate coated with a metal oxide film for a plain glass plate, without re-designing the other parts of the toaster the assembly line for the conventional electric oven-toaster of this type can be utilized to manufacture the electric oven-toaster according to this invention. This is another advantageous feature of the present invention.

The glass plate coated with indium oxide, a constituent member of the cooking appliance according to this invention, was tested in accordance with Notice No.

370 of Ministry of Health and Welfare, "Standards of Food and Additives--Utensils and Container Packing". The test showed that no poisonous substance such as lead and arsenic was detected from the glass plate.

What is claimed as new and desired to be secured by letters patent of the united states is:

1. An electric oven-toaster adapted for toasting a slice of bread, comprising:

a housing enclosing a heating chamber, said housing having a front wall;

a glass window, which can be freely opened and closed, forming part of said front wall of said housing;

food holding means disposed horizontally within said heating chamber;

heating means disposed within said heating chamber for generating infrared rays, said heating means being parallel with both the inner surface of said glass window and said food holding means;

a metal holding reflecting plate disposed within said heating chamber and bent in a manner to surround said heating means and said food holding means to reflect said infrared rays generated by said heating means such that said reflected infrared rays are substantially uniformly distributed on said food holding means; and an infrared reflective film of metal oxide formed on the entire inner surface of said glass window; said glass window being positioned in a manner to provide a predetermined free space between the side edge of said food holding means on the side of said glass window and the lower edge of said glass window and being inclined in a manner to reflect said infrared rays toward said free space and said food holding means.

2. An electric oven-toaster according to claim 1, wherein said means for supporting food has a plane surface on which said food is placed.

3. An electric oven-toaster according to claim 2, wherein said heating means is comprised of two electric heaters disposed above and below said supporting means respectively.

4. An electric oven-toaster according to claim 3, wherein said metal oxide film is an indium oxide film of 1500 to 3000Å thick.

5. An electric oven-toaster according to claim 4, wherein a silica film is formed on the surface of said indium oxide film.

* * * * *